US 008800609B1

(12) United States Patent
Krechowiecki

(10) Patent No.: US 8,800,609 B1
(45) Date of Patent: Aug. 12, 2014

(54) FUEL BIB

(71) Applicant: Jodi Krechowiecki, Regina (CA)

(72) Inventor: Jodi Krechowiecki, Regina (CA)

( * ) Notice: Subject to any disclaimer, the term of this patent is extended or adjusted under 35 U.S.C. 154(b) by 0 days.

(21) Appl. No.: 13/846,450

(22) Filed: Mar. 18, 2013

(51) Int. Cl.
*B65B 1/04* (2006.01)

(52) U.S. Cl.
USPC ............. 141/87; 141/338; 141/364; 222/108; 280/770

(58) Field of Classification Search
USPC ...................... 141/86–88, 286, 337, 338, 364; 222/108–111; 137/310; 220/86.2; 280/770
See application file for complete search history.

(56) References Cited

U.S. PATENT DOCUMENTS

| | | | |
|---|---|---|---|
| 3,451,445 A | 6/1969 | Sippola | |
| 3,992,051 A | 11/1976 | Hitch | |
| 4,013,105 A * | 3/1977 | Uuskallio | 141/86 |
| 4,082,125 A | 4/1978 | Wilson | |
| 4,802,514 A | 2/1989 | Morse | |
| 4,817,691 A | 4/1989 | Lau | |
| 4,830,067 A | 5/1989 | Foutch | |
| D315,705 S | 3/1991 | Smith | |
| 5,027,965 A | 7/1991 | Dumars | |
| 5,165,574 A | 11/1992 | Ratcliffe | |
| 5,571,249 A | 11/1996 | Boylen | |
| 5,690,138 A | 11/1997 | Fuller | |
| 5,785,099 A | 7/1998 | Kashani | |
| 5,875,825 A | 3/1999 | Roberts, Jr. | |
| 6,279,781 B1 | 8/2001 | Konar | |
| 6,532,888 B1 | 3/2003 | Enik | |
| 7,216,778 B2 | 5/2007 | Kaeb | |
| 7,543,612 B1 | 6/2009 | Angel | |

* cited by examiner

Primary Examiner — Jason K Niesz
(74) Attorney, Agent, or Firm — QuickPatents; Kevin Prince

(57) ABSTRACT

A bib for a vehicle fuel tank inlet conduit of the type having an open conduit end comprises a liquid-impervious, elongated tray that has a raised peripheral edge on a front side thereof. The bib includes a top end, a bottom end, and an aperture at the top end for receiving the conduit end therethrough. The bib includes a collection trough at the front side and bottom end thereof that is adapted to receive fuel flowing down the tray, and may include an inverted spout formed between the aperture and the collection trough.

14 Claims, 4 Drawing Sheets

FUEL BIB

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to fuel dispensing, and more particularly to a bib and collection device for fuel tanks

DISCUSSION OF RELATED ART

Refueling vehicles such as boats, automobiles, and the like, as well as filling gasoline containers, often results in fuel being spilled either on the vehicle or on the ground and into the environment. The fuel nozzle, for example, will often continue to drip even after the nozzle has been shut off. Further, when overfilling a fuel tank or container, significant spillage can occur out of the fuel inlet conduit and onto the vehicle or surrounding area.

The following prior art patents all teach devices that aim to prevent fuel from contacting the vehicle:

| U.S. Pat. No. | Issue Date | Inventor |
| --- | --- | --- |
| 4,817,691 | Apr. 4, 1989 | Lau |
| 3,992,051 | Nov. 16, 1976 | Hitch |
| 5,785,099 | Jul. 28, 1998 | Kashani |
| D315705 | Mar. 26, 1991 | Smith |

As perhaps best illustrated in Lau FIG. 4, and Kashani FIG. 3, such devices result in fuel being purposefully directed away from the vehicle and onto the ground. No means for collecting or recapturing such wasted fuel is provided in these prior art devices.

Other prior art patents teach means for not only diverting spilled fuel away from the vehicle, but also for collecting or recapturing such fuel. For example, U.S. Pat. No. 5,571,249 to Boylen on Nov. 5, 1996 teaches a complex fuel recovery system that returns spilled fuel back to the fuel pump. Such a device not only robs the user of the fuel they have already paid for, but such a device is necessarily fixed with the fuel pump and cannot travel with the vehicle or owner of the vehicle.

Other prior art patents teach a means for collecting spilled liquids from a dispenser or aperture, but do not provide for keeping such spilled liquids from contacting the vehicle, as follows:

| U.S. Pat. No. | Issue Date | Inventor | Ref. |
| --- | --- | --- | --- |
| 6,532,888 | Mar. 18, 2003 | Enik | FIG. 6 |
| 6,279,781 | Aug. 28, 2001 | Konar | FIG. 1 |
| 5,027,965 | Jul. 2, 1991 | Dumars | FIG. 1 |
| 4,802,514 | Feb. 7, 1989 | Morse | FIG. 1 |

Still other prior art devices teach a collection device for spilled fuel, or the like, that must be kept in a vehicle trunk, or the like, when not in use, as follows:

| U.S. Pat. No. | Issue Date | Inventor | Ref. |
| --- | --- | --- | --- |
| 4,082,125 | Apr. 4, 1978 | Wilson et al. | FIG. 2 |
| 7,216,778 | May 15, 2007 | Kaeb | FIG. 1 |
| 7,543,612 | Jun. 9, 2009 | Angel et al. | FIG. 1 |

Such prior art devices after just a single use can smell strongly of fuel, and as such when storing such devices within the vehicle, a strong fuel odor can permeate the entire vehicle, even if stored in the trunk. Moreover, such devices are bulky, often rigid and can damage the paint or finish of the vehicle. Further, such products do not allow for the easy reintroduction of fuel back into the fuel tank, but rather assume that the recaptured fuel is to be discarded.

Therefore, there is a need for a device that not only prevents spilled fuel from contacting the vehicle, but also recaptures such spilled fuel and provides a means for easily reintroducing such recaptured fuel back into the fuel inlet conduit of the vehicle. Such a needed device would be flexible so as to be readily folded and stored behind the fuel door of most conventional vehicles. Further, such a needed device would provide means for use with boats for recapturing fuel spilled from a fuel tank air vent upon overfilling of the tank. Still further, such a needed device would be relatively easy to manufacture, use and store. The present invention accomplishes these objectives.

SUMMARY OF THE INVENTION

The present device is a bib for a vehicle fuel tank inlet conduit of the type having an open conduit end and optionally a screw cap. Alternately the bib may be used when filling a gasoline container, or other receptacle for fuel or other liquids with a dispensing nozzle or the like.

The bib comprises a liquid-impervious, elongated and pliable tray that has a raised peripheral edge on a front side thereof. The bib includes a top end, a bottom end, and an aperture at the top end for receiving the conduit end therethrough. The bib includes a collection trough at the front side and bottom end thereof that is adapted to receive fuel flowing down the tray.

In use, with the aperture of the top end of the tray fitted around the conduit end, fuel dripping from either the conduit end or a nozzle flows down the tray and into the collection trough.

The front side of the tray may further include an inverted spout formed between the aperture and the collection trough. As such, when the tray is inverted and the spout is positioned at the opening of the conduit end, any fuel collected in the collection trough is funneled by the spout to flow into the conduit end, thereby facilitating the recapture of the fuel.

In one embodiment, a neck extends rearward at the aperture and is adapted for insertion into the conduit end. The bib may further include a front cover extending upward from the collection trough and terminating at a top end. The front cover further includes an aperture therethrough and adapted for receiving the nozzle therethrough. The aperture is aligned with the aperture of the tray. A spout may be formed between the tray and the front cover at the peripheral edge of the tray, whereby when the bib is rotated fuel captured within the collection trough may be poured therefrom at the spout, such as into the conduit end, a gasoline container, or the like.

The present invention is a device that not only prevents spilled fuel from contacting the vehicle, but also recaptures such spilled fuel and provides a means for easily reintroducing such recaptured fuel back into the fuel inlet conduit of the vehicle. The present device is flexible so as to be readily folded and stored behind the fuel door of most conventional vehicles. Further, the present invention provides means for use with boats for recapturing fuel spilled from a fuel tank air vent upon overfilling of the tank. The present invention is relatively easy to manufacture, use and store. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
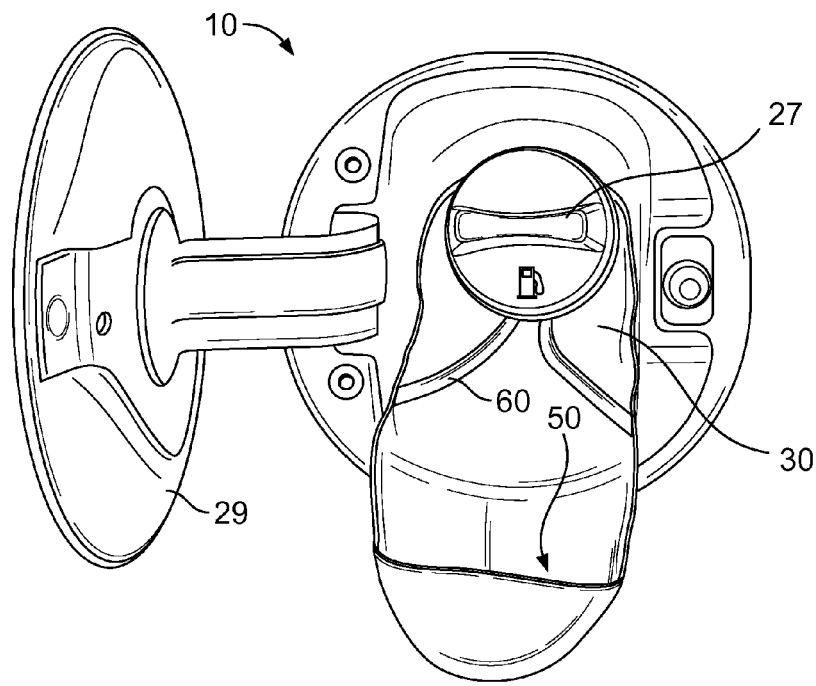
FIG. 1 is a perspective view of the invention shown installed on a fuel tank inlet conduit of a vehicle.
Figure 2:
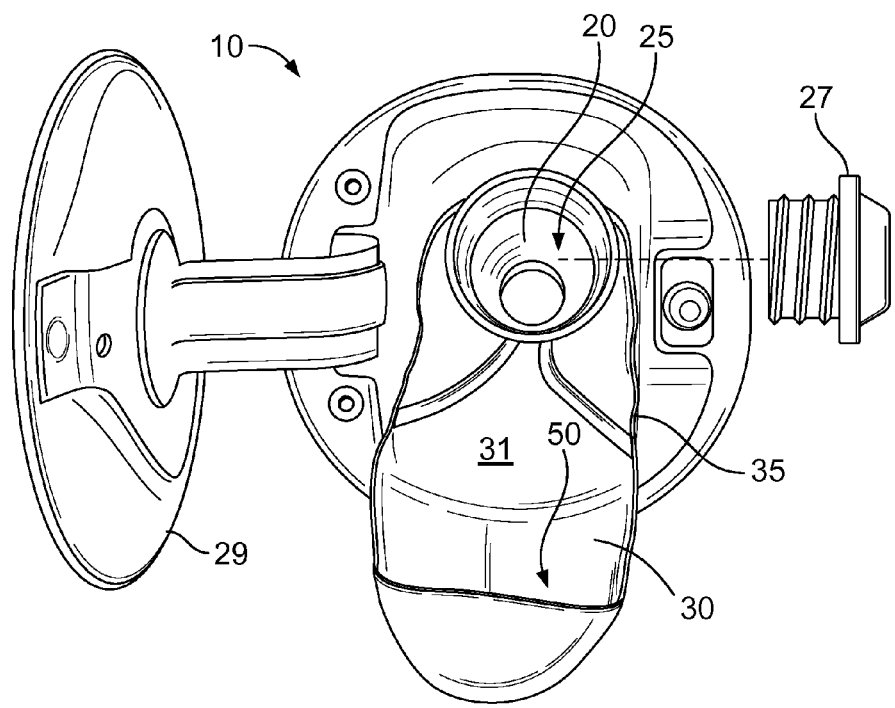
FIG. 2 is a perspective view of FIG. 1 but with a screw cap exploded away therefrom.
Figure 3:
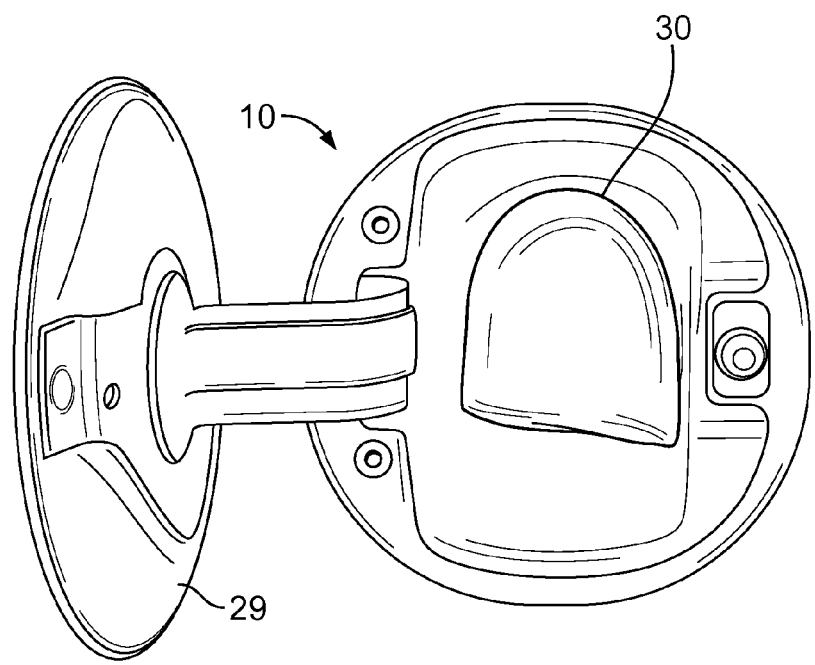
FIG. 3 is a perspective view of FIG. 1 but with the invention folded so as to be stored behind a fuel tank inlet cover of the vehicle.
Figure 4:
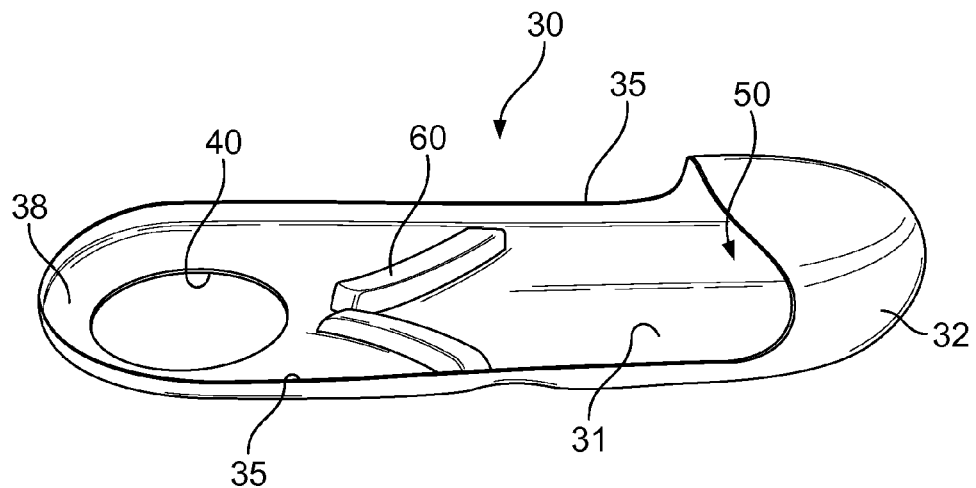
FIG. 4 is a side perspective view of FIG. 1 shown as removed from the fuel tank inlet conduit.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-4 illustrate a bib 10 for a vehicle fuel tank inlet conduit 20 of the type having an open conduit end 25 and optionally a screw cap 27. Alternately the bib 10 may be used when filling a gasoline container (not shown), or other receptacle for fuel 21 or other liquids with a dispensing nozzle 28 or the like.

The bib 10 comprises a liquid-impervious, elongated and pliable or flexible tray 30 that has a raised peripheral edge 35 (FIG. 4) on a front side 31 thereof. The bib 10 includes a top end 38 and a bottom end 32. The tray 30 is preferably made from a flexible rubber material, such as silicon rubber or a resilient plastic that is impervious to petroleum liquids and the like. As such, the bib 10 may be folded and stored behind a vehicle fuel door 29 (FIG. 3) when not in use.

The bib 10 includes an aperture 40 at the end 38 thereof for receiving the conduit end 25 therethrough. Alternately, the aperture 40 may instead be a slot (not shown) or other structure adapted for being fixed with the conduit end 25.

The bib 10 includes a collection trough 50 at the front side 31 and bottom end 32 thereof. The collection trough 50 is adapted to receive fuel 21 flowing down the tray 30 that is spilled while fueling the vehicle, and as such has a capacity of preferably a few ounces. In use, with the aperture 40 of the top end 38 of the tray 30 fitted around the conduit end 25, fuel 21 (FIG. 5) dripping from either the conduit end 25 or a nozzle 28 flows down the tray 30 and into the collection trough 50.

The front side 31 of the tray 30 may further include an inverted spout 60 formed between the aperture 40 and the collection trough 50. As such, when the tray 30 is inverted and the spout 60 is positioned at the opening of the conduit end 25, any fuel 21 collected in the collection trough 50 is funneled by the spout 60 to flow into the conduit end 25, thereby facilitating the recapture of the fuel 21.

In one embodiment, a neck 70 (FIGS. 5-7) extends rearward at the aperture 40 and is adapted for insertion into the conduit end 25. In one embodiment, the thickness of the neck is insignificant to the operation of the screw cap 25, deforming around the threads of the screw cap 25 as necessary. Alternately, such a neck 70 may additionally include a plurality of outward radially-projecting resilient lips 80 for securing the neck into the conduit end 25 by friction. An outward radially-projecting screw thread (not shown) may also be used for the same purpose. Preferably the neck 70 and lips 80 are integrally formed with the tray 30 of the same materials.

Figure 5:
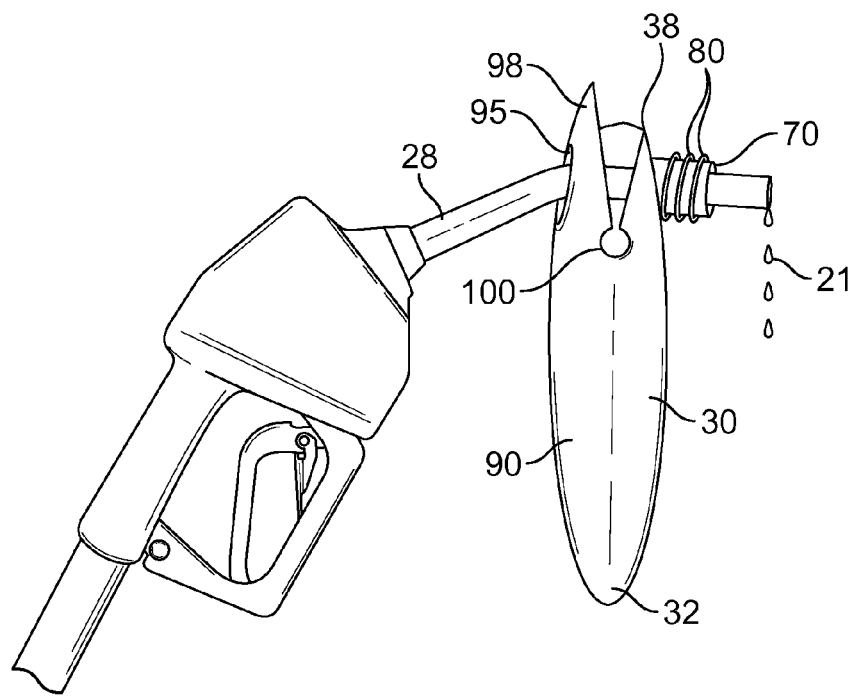
FIG. 5 is a side elevational view of an alternate embodiment of the invention.
Figure 6:
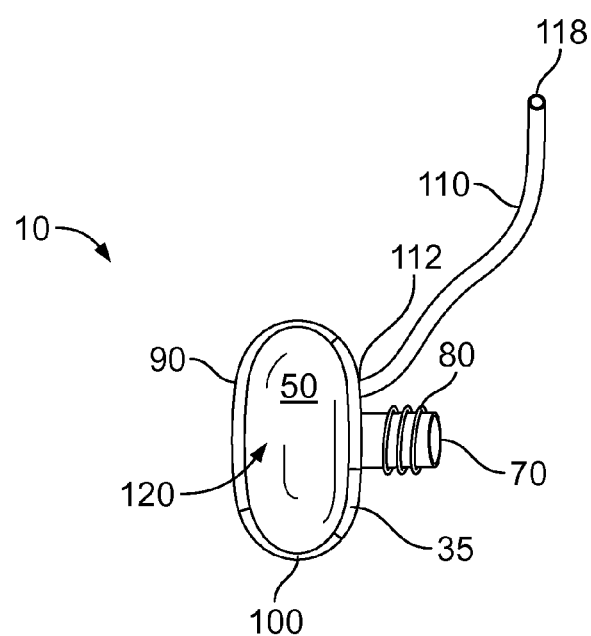
FIG. 6 is a top plan view of an embodiment similar to that of FIG. 5 but with a vent hose attached thereto.
Figure 7:
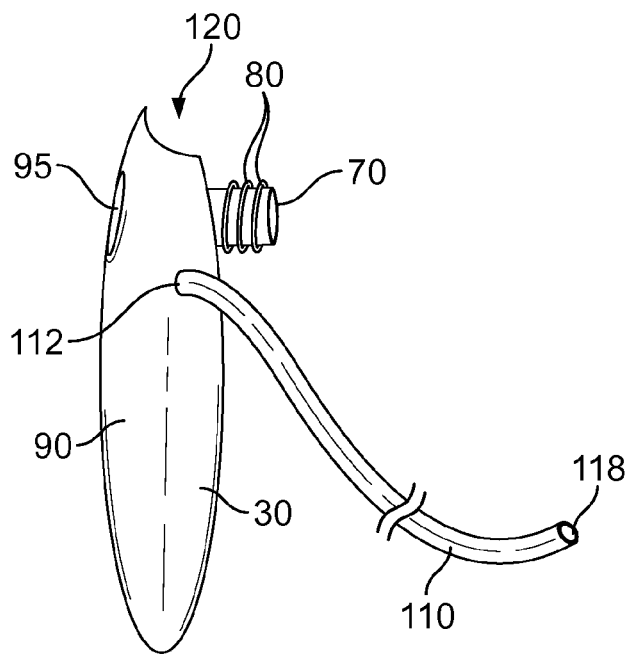
FIG. 7 is a side elevational view of FIG. 6.
Figure 8:
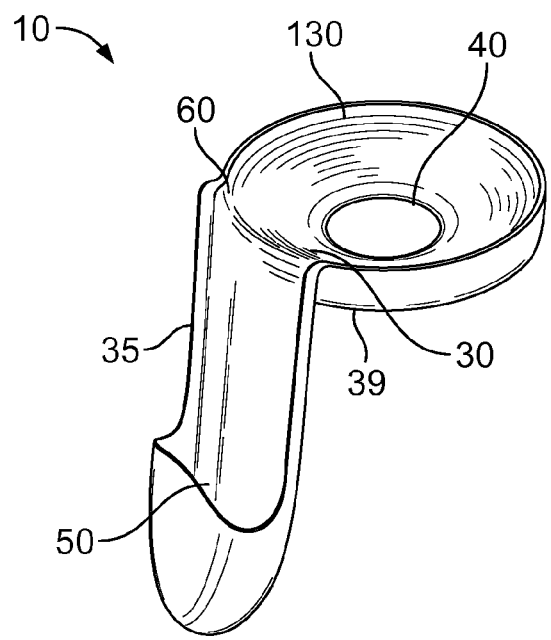
FIG. 8 is a perspective view of another alternate embodiment of the invention.

The bib 10 may further include a front cover 90 (FIGS. 5-7) extending upward from the collection trough 50 and terminating at a top end 98. The front cover 90 further includes an aperture 95 therethrough and adapted for receiving the nozzle 28 therethrough (FIG. 5). The aperture 95 is aligned with the aperture 40 of the tray 30. A spout 100 may be formed between the tray 30 and the front cover 90 at the peripheral edge 35 of the tray 30, whereby when the bib 10 is rotated fuel 21 captured within the collection trough may be poured therefrom at the spout 100, such as into the conduit end 25, a gasoline container (not shown), or the like. Preferably the front cover 90 and the tray 30 are integrally formed and attached along substantially the entire peripheral edge 31 of the tray except at a top opening 120 (FIGS. 6 and 7).

Further, a vent hose 110 may be included in such an embodiment, the vent hose 110 in fluid communication with the collection trough 50 at a proximal end thereof. A distal end 118 of the vent hose 110 is adapted for fluid communication with a gas tank vent of a boat or the like (not shown), such that fuel 21 exiting the gas tank vent 27 is directed by the vent hose 110 into the collection trough 50. Preferably the front cover 90 and vent hose 110 are integrally formed with the tray 30 of the same materials.

In one embodiment, the tray 30 may include a funnel portion 130 at the top end 32 thereof, for use when the opening of the conduit end 25 is horizontally oriented, such with many gasoline containers (not shown) and with certain boats and other vehicles. As such, fuel 21 spilled immediately around the conduit end 25 is funneled into the conduit end 25. Fuel 21 dripping from the nozzle 28 as it approaches or is removed from the conduit end 25 may still be captured by rolling down the tray 30 and into the collection trough 50. A spout 60 may be further included with such an embodiment.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A bib for a fuel tank inlet conduit of the type having a conduit end and a screw cap, the bib comprising a liquid-impervious, elongated, and pliable tray having a raised peripheral edge on a front side thereof, an aperture at a top end thereof for receiving the conduit end, and at a bottom end a collection trough, the tray including an inverted spout formed on the front side of the tray between the aperture and the collection trough, whereby with the aperture of the top end fitted around the conduit end, fuel dripping from the conduit end roll down the tray and into the collection trough, and whereby when the tray is inverted and the spout is positioned at the opening of the conduit end, any fuel collected in the collection trough is funneled by the spout to flow into the conduit end.

2. The bib of claim 1 wherein the tray is made from a flexible rubber material.

3. The bib of claim 1 wherein the tray is made from a flexible silicon rubber material.

4. The bib of claim 1 wherein the tray is made from a resilient plastic material.

5. A bib for a fuel tank inlet conduit of the type having a conduit end and a screw cap, the bib comprising a liquid-impervious, elongated, and pliable tray having a raised peripheral edge on a front side thereof, an aperture at a top end thereof, a neck extend rearward at the aperture and adapted for insertion into the conduit end, and at a bottom end a collection trough, the tray including an inverted spout formed on the front side of the tray between the aperture and the collection trough, whereby with the neck of the top end fitted into the conduit end, fuel dripping from the conduit end roll down the tray and into the collection trough, and whereby when the tray is inverted and the spout is positioned at the opening of the conduit end, any fuel collected in the collection trough is funneled by the spout to flow into the conduit end.

6. The bib of claim 5 wherein the tray is made from a flexible rubber material.

7. The bib of claim 5 wherein the tray is made from a flexible silicon rubber material.

8. The bib of claim 5 wherein the tray is made from a resilient plastic material.

9. The bib of claim 5 wherein the neck further includes a plurality of outwardly-projecting resilient lips for securing the neck into the conduit end by friction.

10. A bib for a fuel tank inlet conduit of the type having a conduit end and a screw cap, the bib comprising a liquid-impervious, elongated, and pliable tray having a raised peripheral edge on a front side thereof, an aperture at a top end thereof, a neck extend rearward at the aperture and adapted for insertion into the conduit end, and at a bottom end a collection trough, the bib including a front cover extending upward from the collection trough and terminating at a top end having an aperture therethrough adapted for receiving a nozzle therethrough, the aperture thereof aligned with the aperture of the tray, a spout being formed between the tray and the front cover at a peripheral edge of the tray, whereby with the neck of the top end fitted into the conduit end, fuel dripping from the conduit end roll down the tray and into the collection trough, and whereby when the bib is rotated fuel captured within the collection trough may be poured therefrom at the spout.

11. The bib of claim 10 further including a vent hose in fluid communication with the collection trough at a proximal end thereof, a distal end thereof adapted for connection with a gas tank vent, whereby fuel exiting the gas tank vent is directed by the vent hose into the collection trough.

12. The bib of claim 10 wherein the front cover and the tray are integrally formed and attached at substantially the entire peripheral edge of the tray except at a top opening.

13. The bib of claim 1 further including a funnel portion at the top end of the tray, the aperture thereof adapted for connecting with the opening of a horizontally-oriented conduit end, whereby fuel spilled immediately around the conduit end is funneled into the conduit end.

14. The bib of claim 5 further including a funnel portion at the top end of the tray, the aperture thereof adapted for connecting with the opening of a horizontally-oriented conduit end, whereby fuel spilled immediately around the conduit end is funneled into the conduit end.

\* \* \* \* \*